US007889396B2

(12) United States Patent
Chen et al.

(10) Patent No.: US 7,889,396 B2
(45) Date of Patent: Feb. 15, 2011

(54) ENGRAVING METHOD FOR A LASER ENGRAVER

(75) Inventors: Tsung-I Chen, Hsi Chih (TW); Yu-Hsiang Wang, Hsi Chih (TW)

(73) Assignee: Great Computer Corporation, Taipei Hsien (TW)

( * ) Notice: Subject to any disclaimer, the term of this patent is extended or adjusted under 35 U.S.C. 154(b) by 1153 days.

(21) Appl. No.: 11/583,977

(22) Filed: Oct. 20, 2006

(65) Prior Publication Data

US 2008/0094663 A1 Apr. 24, 2008

(51) Int. Cl.

| | |
|---|---|
| ***B41C 1/02*** | (2006.01) |
| ***B41C 1/04*** | (2006.01) |
| ***G06K 15/00*** | (2006.01) |
| ***H04N 1/40*** | (2006.01) |
| *G06F 15/00* | (2006.01) |
| *G06F 3/12* | (2006.01) |

(52) U.S. Cl. ....................................... 358/3.29; 358/1.1

(58) Field of Classification Search .................. 358/1.1, 358/1.13, 3.29, 1.18
See application file for complete search history.

(56) References Cited

U.S. PATENT DOCUMENTS

| | | | | |
|---|---|---|---|---|
| 6,950,212 | B1 * | 9/2005 | Weidlich | 358/3.29 |
| 7,350,461 | B2 * | 4/2008 | Mayer et al. | 101/150 |

* cited by examiner

*Primary Examiner*—Douglas Q Tran
(74) *Attorney, Agent, or Firm*—Muncy, Geissler, Olds & Lowe, PLLC

(57) ABSTRACT

In an engraving method for a laser engraver, an engraving apparatus of the laser engraver performs an engraving for data of a transversal engraving line and then engraves for data of a transversal engraving line in a jumping mode to improve a banding phenomenon and enhance the engraving quality, further the engraving data points of each transversal engraving line can also be engraved in the jumping mode, so as to enhance the overall quality of the engraved object and effectively lower the visual effect of an uneven brightness of traditional laser engravers.

4 Claims, 3 Drawing Sheets

ENGRAVING METHOD FOR A LASER ENGRAVER

FIELD OF THE INVENTION

The present invention relates to an engraving method for a laser engraver, and more particularly to an engraving method that performs an engraving for the data of a next transversal engraving line in a jumping mode to improve a banding phenomenon and enhance the engraving quality, and such method is applicable for a laser manufacturing apparatus such as a laser engraver.

BACKGROUND OF THE INVENTION

In the basic principle of a general laser engraver, an output laser beam is guided and focused onto the surface of an engraving object, and the focused beam is absorbed by the material of the engraving object, such that the material is aerated by an instant rise of temperature, and the surface of the object is indented to achieve the engraving and cutting effects.

The laser engraving and cutting process is very simple and easy, which is similar to printing an output on a piece of paper by a computer and a printer, and the only difference resides on that a powder ink is coated on the paper for printing, but a laser is projected on a material such as wood, acrylic, metal, and stone for laser engraving.

When a traditional laser engraver performs an engraving, its engraving apparatus engraves a work piece sequentially and linearly from top to bottom along the transversal engraving lines A, B, C, D as shown in FIG. 1. Although such operating mode can achieve the output effect, a banding phenomenon caused by fluctuated energies occurred in a laser engraving will adversely affect the engraving quality and the visual effect of the brightness of the engraved product. Thus, breakthroughs on the quality of laser engraving products are needed for such long-existing shortcoming.

SUMMARY OF THE INVENTION

It is a primary objective of the present invention to provide an engraving method for a laser engraver that can quickly improve the engraving quality and enhance the banding phenomenon.

To achieve the foregoing objective, an engraving method for a laser engraver in accordance with the present invent is characterized in that an engraving apparatus of the laser engraver performs an engraving for the data of a transversal engraving line and then engraves for the data of a transversal engraving line in a jumping mode to improve the banding phenomenon and enhance the engraving quality, further the engraving data points of each transversal engraving line can also be engraved in the jumping mode, so as to enhance the overall quality of the engraved object and effectively lower the visual effect on an uneven brightness of traditional laser engravers.

The present invention will become apparent in the following detailed description of the preferred embodiments with reference to the accompanying drawings.

DETAILED DESCRIPTION OF THE PREFERRED EMBODIMENT

Figure 1:
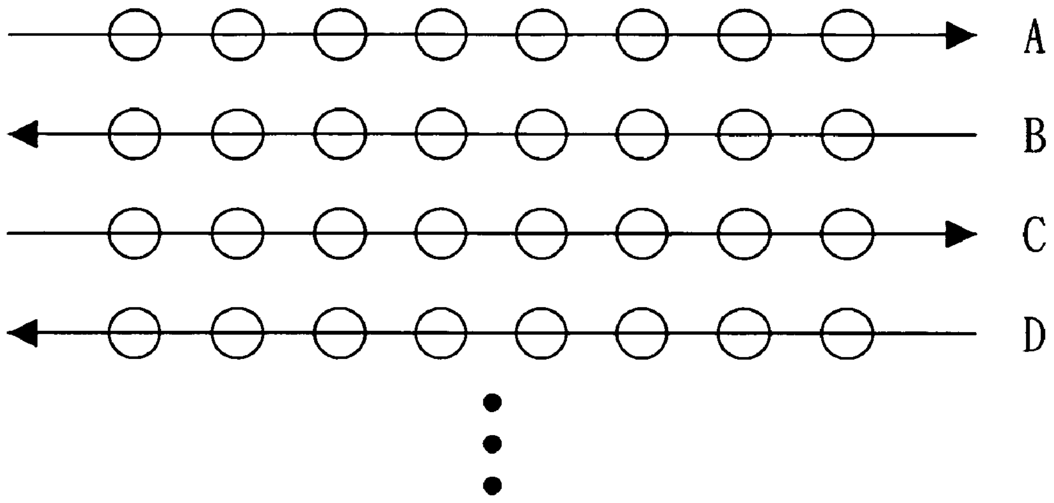
Fig. 1 (Prior Art)
FIG. 1 is a schematic view of an engraving apparatus that engraves a work piece sequentially and vertically from top to bottom when a prior art laser engraver performs an engraving.
Figure 2:
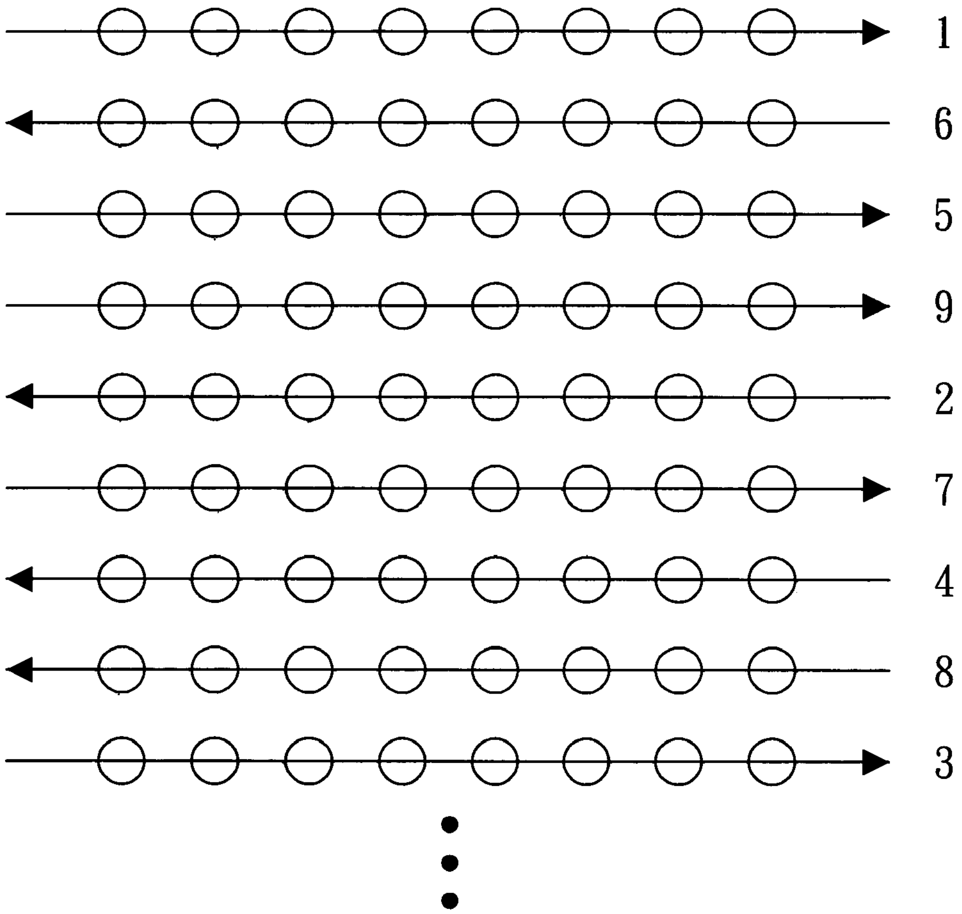
FIG. 2 is a schematic view of performing an engraving for the data of a transversal engraving line in a jumping mode in accordance with a preferred embodiment of the present invention.

Referring to FIG. 2 for an engraving method for a laser engraver in accordance with a preferred embodiment of the present invention, the characteristic resides on that an engraving apparatus of the laser engraver performs an engraving for the data of a transversal engraving line 1, and then performs an engraving for the data of a transversal engraving line 2 in a jumping mode.

The foregoing jumping mode is one selected from an odd transversal line jumping engraving, an even transversal line jumping engraving and a random transversal line jumping engraving as shown in FIG. 2. The engraving apparatus performs an engraving by the random transversal line jumping engraving as shown in the first to the ninth transversal engraving lines as shown in the figure. After the engraving for the data of the transversal engraving line 1 is completed, the engraving apparatus will jump to the transversal engraving line 2 for engraving further data, and then will jump to the transversal engraving line 3 for engraving further data, and the engraving apparatus is set up by a control unit to confirm its jumping mode.

Therefore, users can set the required jumping mode by a control unit for the applications, such that the engraving can be performed by an odd transversal line jumping engraving, an even transversal line jumping engraving or a random transversal line jumping engraving. The aforementioned engraving can be performed after the engraving apparatus of the laser engraver is set and turned on.

Figure 3:
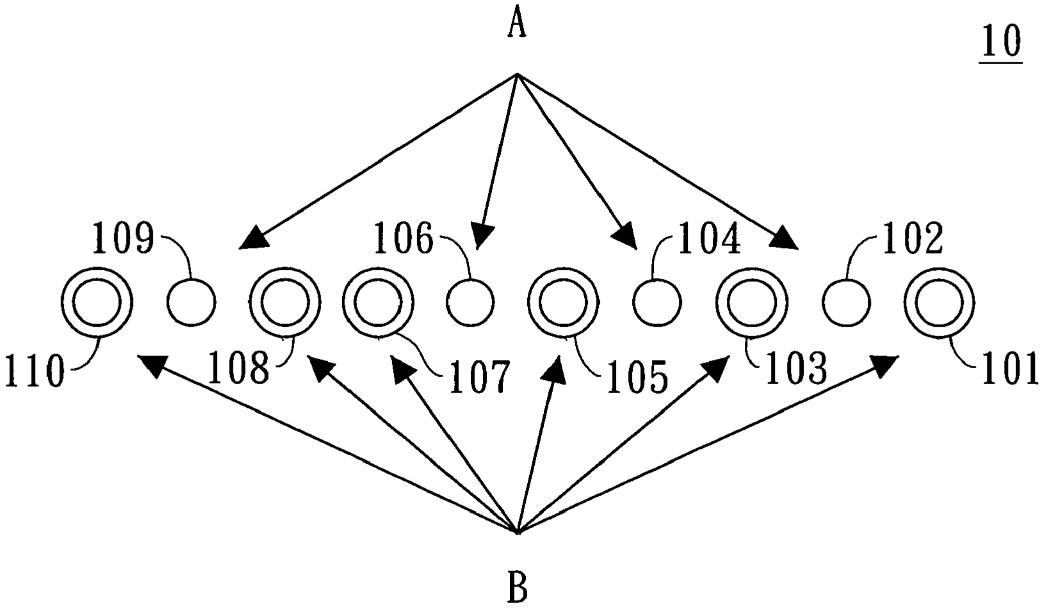
FIG. 3 is a schematic view of performing an engraving in a jumping mode for the engraving data points in a transversal engraving line in accordance with a preferred embodiment of the present invention.

The concept of performing an engraving in a jumping mode in accordance with the present invention also can be used for a plurality of engraving data points in a single transversal engraving line as shown in FIG. 3. The transversal engraving line 10 includes a plurality of engraving data points 101~110, and these engraving data points 101~110 are formed by a jumping mode engraving by the engraving apparatus of the laser engraver. The jumping mode engraving of the engraving data points 101~110 is one selected from an odd data point jumping engraving, an even data point jumping engraving and a random data point jumping engraving. In FIG. 3, a portion A of the engraving data points (including the engraving data points 102, 104, 106, 109) is formed by the random data point jumping engraving. After the engraving apparatus completes engraving the data points in a jumping mode, a portion B of the data points (including the engraving data points 101, 103, 105, 107, 108) is engraved in a jumping mode.

Therefore, the present invention provides an engraving method for engraving the data of a transversal engraving line in a jumping mode to improve the banding phenomenon and enhance the engraving quality, and the engraving data points of each transversal engraving line also can be engraved in the jumping mode, so as to improve the overall engraving quality of the engraving object and effectively lower the visual effect of an uneven brightness of traditional laser engravers.

While the invention has been described by means of a specific numerous modifications and variations could be made thereto by those skilled in the art without departing from the scope and spirit of he invention set forth in the claims.

In summation of the above description, the present invention definitely achieves the expected objective and provides an engraving method for a laser engraver to enhance the performance over the prior art. The invention further complies with the patent application requirements and is duly filed for the patent application.

What is claimed is:

1. An engraving method for a laser engraver, wherein:

an engraving apparatus of said laser engraver performs an engraving for a data of a transversal engraving line, and then engraves a data of a transversal engraving line in a jumping mode, said jumping mode being one selected from an odd transversal line jumping engraving, an even transversal line jumping engraving, and a random transversal line jumping engraving.

2. The engraving method for a laser engraver of claim 1, wherein said engraving apparatus is set by a control unit to confirm said jumping mode.

3. The engraving method for a laser engraver of claim 1, wherein said each transversal engraving line includes a plurality of engraving data points, and said engraving data points are engraved by said engraving apparatus of said laser engraver in a jumping mode.

4. The engraving method for a laser engraver of claim 3, wherein said jumping mode engraving of said engraving data points is one selected from an odd data point jumping engraving, an even data point jumping engraving and a random data point jumping engraving.

* * * * *